Figure 1:
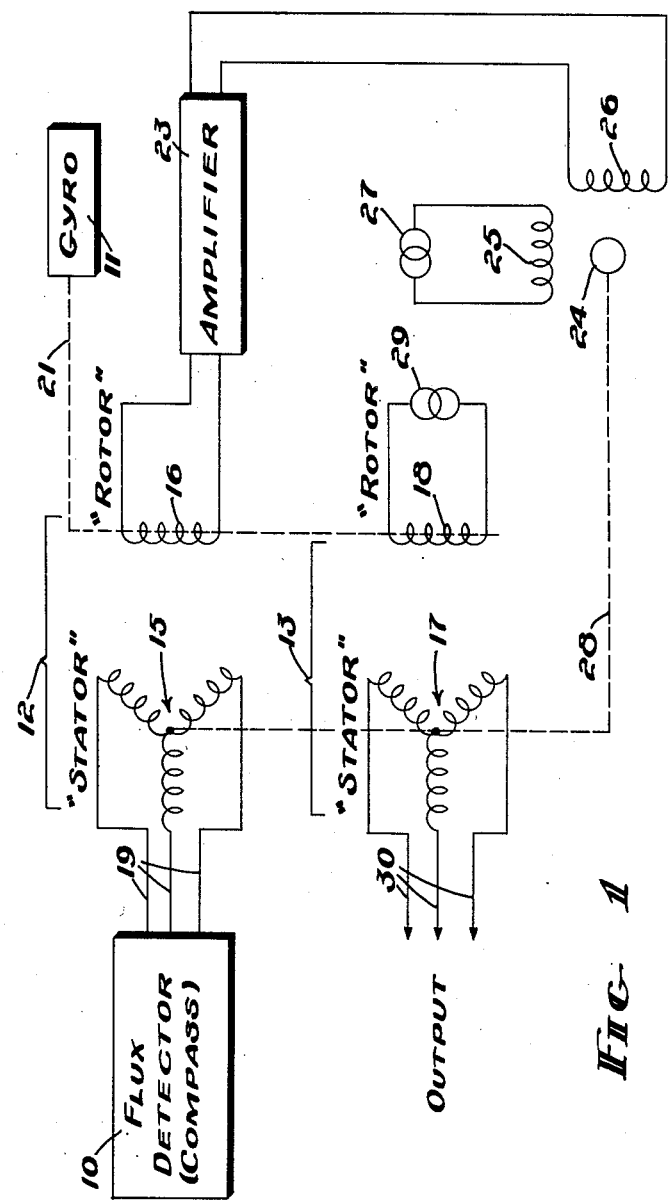

INVENTORS
PAUL A. McKINLEY
ROLF W. WOLLAN
By Moody & Hatcher
ATTORNEYS

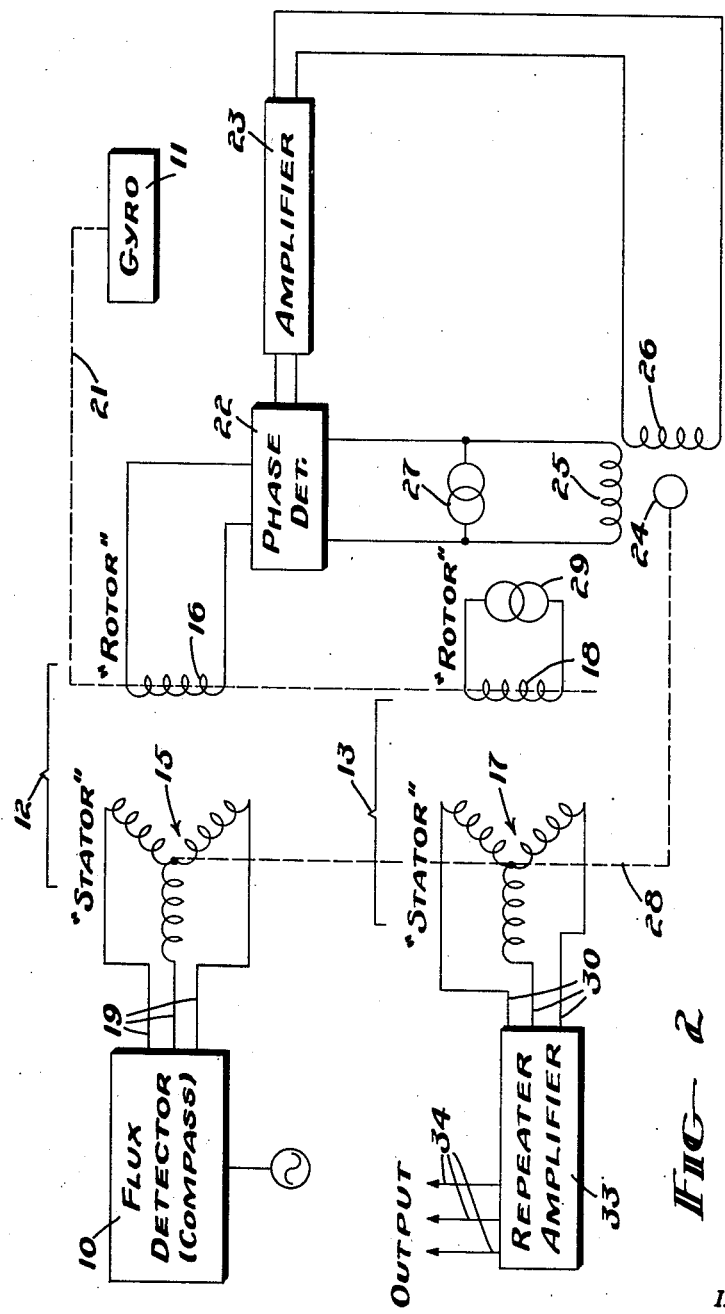

United States Patent Office 2,800,723
Patented July 30, 1957

2,800,723
STABILIZED MAGNETIC COMPASS

Rolf W. Wollan and Paul A. McKinley, Cedar Rapids, Iowa, assignors to Collins Radio Company, Cedar Rapids, Iowa, a corporation of Iowa Application October 13, 1955, Serial No. 540,192

6 Claims. (Cl. 33—222)

This invention relates to magnetic compass systems and more particularly to magnetic compass systems stabilized by a gyroscope.

Prior art compass systems utilizing a gyroscope for stabilization involved a compass, a gyro, and various ways of combining the gyro and compass positions by crude and cumbersome ways which involved excessive weight, uncontrollable errors, and other undesirable features. More recent prior art systems have involved precession of the gyro in response to compass error indication which create unnecessary problems in gyro stability. Other forms of gyro repositioning in these systems also involved the gyro to such an extent as to lose the desirable stability thereof.

The objects of this invention are to provide a compact, lightweight device which utilizes the good features of a magnetic compass system and a gyro each operating within its capabilities with a minimum of other elements. The elimination of many elements found in the prior art and their weight is a further object.

One of the features of this system is the use of synchros wherein the magnetic compass and the gyro are not loaded by mechanical impedance or striction (static friction) and in which the output has a relatively high power capability for the unit per se.

A further feature of the invention is the mechanical rotation of both stator and rotor of synchros yielding thereby four possible variables as opposed to the three possible otherwise. This arrangement makes possible a very considerable weight and element reduction.

Further objects, features, and advantages of the invention will become apparent from the following description and claims when read in conjunction with the drawings, in which:

Figure 1 is a simplified version of the invention; and
Figure 2 is a second version of the invention showing additional elements providing higher output power capabilities.

Figure 1 shows a flux detector 10 and a gyro 11. Flux detector 10 is a magnetic flux sensing system which yields a three-wire voltage having an electrical position sense indicating the relative direction of the magnetic field sensed, in this case the horizontal component of the earth's magnetic field. Gyro 11 is a gyro having a horizontal axis, and stability, therefore, in the horizontal plane. This gyro has the usual erecting circuits incorporated by which the axis of rotation is maintained in a horizontal position.

Synchros 12 and 13 are coupled rotor to rotor and stator to stator. Synchro 12 has a stator 15 rotatably mounted and a rotor 16. Synchro 13 has a stator 17 and a rotor 18, both of which are rotatably mounted as are those of synchro 12. The output of flux detector 10 is connected to the stator 15 of synchro 12 by means of three wires 19 which carry an electrical position sense.

Gyro 11 is connected by coupling 21 to the two rotors 16 and 18. The two rotors constitute the sole mechanical load resisting the rotation of gyro 11 moving about its vertical axis, barring motor action of synchro 13 when too great a load is placed on the output circuit 30. Coupling 21 may be a shaft extending from the vertical gimbal of gyro 11 or may be a connection by other means well known in the art.

Rotor 16 is connected electrically to amplifier 23. A voltage arising in rotor 16 indicates the error or difference of position between gyro 11 and flux detector 10. Amplifier 23 amplifies this voltage. Amplifier 23 may be any of the types well known in the art such as, e. g., electron tube, magnetic amplifier, or transistor amplifier.

Motor 24 is a two-phase motor having two phase windings 25 and 26. One of the windings 25 is excited from a source of voltage of the same frequency as the output of rotor 16. That is to say, with an alternating current of predetermined frequency input to the flux detector 10 there will be double frequency at stator 15, double frequency at rotor 16 so that the two-phase motor 24 operates as a phase detecting device. Supply 27 is thus double the flux detector exciting frequency. The other winding, 26, of motor 24 is connected to the output of amplifier 23. The output shaft of motor 24 is mechanically coupled to the stators 15 and 17, at a speed ratio consistent with system stability. Rotor 18 of synchro 13 is excited by a source 29 of such frequency as desired for the output voltage. The output voltage is taken from wires 30 connected to stator 17.

In Figure 2 an alternative method of phase detecting is illustrated whereby phase detector 22 utilizes the error voltage from rotor 16 and reference voltage from source 27. The output voltage has a phase indicative of the error difference in position between flux detector 10 and gyro 11.

Amplifier 23 amplifies this voltage and applies it to winding 26 of the two-phase motor 24. Voltage 27 serves as a reference voltage for the second field winding of motor 24. Motor 24 is used in this figure merely as a motor which may be reversed by reversal of phase of the control voltage.

A further element which may be used in either figure is a repeater amplifier 33 which may take any of several forms well known in the art wherein the electrical voltage on wires 30 is utilized to drive the repeater amplifier and whereby the output 34 has any desired high power capability without reflecting any load back through the stator 17 by motor action in rotor 18 against gyro 11.

The compass system of Figure 1 operates in the following manner: A flux detector, as commonly known in the art, produces a three-wire voltage having an electrical position sense correlative to the direction of the earth's magnetic field. A form of flux detector useable with this system is that shown in United States Patent No. 2,786,179, issued March 19, 1957 to Arnold and McKinley for "Flux Detector." This voltage is applied to stator 15. By transformer action a voltage appears in rotor 16 when it is in other than a null position. Gyro 11 assumes some stable position and turns rotor 16 mechanically concurrently.

If rotor 16 is not in a null position, an error voltage arises. This error voltage is amplified by amplifier 23 and applied to winding 26 of two-phase motor 24. As an inherent characteristic of a two-phase motor, motor 24 acts as a phase detector and rotates in the proper direction to eliminate the error volage. This, of course, assumes the proper polarity of source 27 relative to the rest of the system.

When motor 24 rotates it turns also stators 17 and 15 to reposition the two stators. The mechanical rotation of stator 15 is in a sense which reduces the error voltage at rotor 16. As a consequence, the loop readjusts itself to a no error condition.

Stator 17 is carried around at the same time and generates a voltage by transformer action from rotor 18. This voltage is a duplicate of the output voltage of the flux detector, but at a higher power level, isolated from both the flux detector and gyro, and stabilized by the latter.

The system of Figure 2 operates similarly to Figure 1 except that the phase detector 22 detects the characteristics of the error voltage at an earlier stage and power level, displacing motor 24 from its phase detector functions. The alternating output voltage of phase detector 22 thus has the phase necessary to drive motor 24 in the direction to correct the error sensed. The reference voltage circuits are slightly different as a consequence.

Repeater amplifier 33, which may also be used in Figure 1 if desired, is excited by the position sensed voltage on wires 30. Amplifier 33 gives an output voltage directly related thereto and isolated from the source, stator 17.

The rotors 16, 18 and stators 15, 17 may be interchanged if necessary, as to their mechanical position inputs. The form shown is preferred, however, because of a lower striction load and much smaller moment of inertia imposed on the motion of the gyro by the rotors of the synchros.

Although this invention has been described with respect to particular embodiments thereof, it is not to be so limited because changes and modifications may be made therein which are within the full intended scope of the invention as defined by the appended claims.

We claim:

1. A stabilized magnetic compass system comprising a magnetic compass having a position output, a horizontal gyro, a pair of synchros each having a plurality of relatively rotatable windings, said windings being rotatably mounted and mutually magnetically coupled, corresponding windings of each synchro being mechanically coupled to said gyro, a motor, said motor being mechanically coupled to rotate the other corresponding windings of each synchro and excited electrically by the error derived from the first of said synchros between the gyro position and the compass position, a winding of the first of said synchros being excited electrically by said compass output, and a winding of said other synchro comprising the output circuit.

2. A stabilized magnetic compass system comprising a magnetic compass having a position output, a horizontal gyro, a pair of synchros each having stator and rotor, both of said rotors thereof being mechanically coupled to said gyro, a motor, said motor being mechanically coupled to rotate both of said stators and excited electrically by the error derived by the first of said synchros from a difference between the gyro position and the compass position, the stator of the first of said synchros being excited electrically by said compass output, and the electrical circuit of said stator of the other of said synchros comprising the output.

3. A stabilized compass system comprising a flux detector compass yielding three wire electrical position sensed voltage, a horizontal gyro, a first and second synchro, each having a stator and a rotor, a two-phase motor, said flux detector being connected electrically to said stator of said first synchro and the output terminals of the system being connected to the terminals of said stator of said second synchro, the mechanical output of said two-phase motor rotating mechanically both of said stators, the mechanical output of said gyro rotating both of said rotors, and electrical means coupling said motor to said rotor of said first synchro, said electrical means driving said two-phase motor so as to reduce said first rotor error voltage.

4. A synchro stabilized magnetic compass system comprising a magnetic compass yielding electrical position sensed information, a first synchro having a first stator and a first rotor each rotatably mounted, means coupling the electrical information of said compass to said first stator, a second synchro having a second stator and second rotor each rotatably mounted, motor means electrically coupled to said first rotor for sensing a voltage therein and operating therefrom, the output of said motor means rotating both said first and said second stators to reduce said voltage, a gyro rotatably coupled to both said first and said second rotors, and a reference voltage connected to said second rotor, whereby said second stator comprises an output source for a stabilized position sensed voltage.

5. A stabilized compass system having a first and second synchro each having a rotatably mounted stator and rotor, a compass electrically connected to one of said stators, a gyro connected mechanically to both of said rotors, a reference voltage, an electrical connection between said reference voltage and the second of said synchro rotors, a two-phase motor mechanically coupled to rotate both of said stators, a second reference voltage, said motor having two windings, means coupling one of said windings to said second reference voltage, means coupling the other of said windings to the error voltage generated in said first rotor, and output terminals connected to the stator of said second synchro.

6. A stabilized magnetic compass system comprising a magnetic compass having an electrical position output, a horizontal gyro, a pair of synchros each having a relatively movable first and second winding means, both of said winding means in each synchro being rotatably mounted and mutually magnetically coupled, corresponding winding means of each synchro being mechanically coupled to said gyro, motor means, said motor means being mechanically coupled to rotate the other corresponding winding means of each synchro, said motor being excited electrically by the error derived from the first of said synchros between the gyro position and the compass position, a winding means of the first of said synchros being excited electrically by said compass output, and a winding means of said other synchro comprising the electrical output circuit.

References Cited in the file of this patent

UNITED STATES PATENTS

| 2,611,190 | McCallum et al. | Sept. 23, 1952 |
| 2,647,233 | Kutzler | July 28, 1953 |

FOREIGN PATENTS

| 690,011 | Great Britain | Apr. 8, 1953 |